(12) United States Patent
Aagaard et al.

(10) Patent No.: US 10,754,394 B2
(45) Date of Patent: Aug. 25, 2020

(54) HINGED DEVICE

(71) Applicant: Microsoft Technology Licensing, LLC, Redmond, WA (US)

(72) Inventors: Karsten Aagaard, Monroe, WA (US); Errol M. Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 16/174,705

(22) Filed: Oct. 30, 2018

(65) Prior Publication Data

US 2020/0133349 A1  Apr. 30, 2020

(51) Int. Cl.

| E05D 15/00 | (2006.01) |
|---|---|
| G06F 1/16 | (2006.01) |
| F16C 11/04 | (2006.01) |
| E05D 11/00 | (2006.01) |
| E05D 3/06 | (2006.01) |

(52) U.S. Cl.
CPC ............ *G06F 1/1681* (2013.01); *E05D 3/06* (2013.01); *E05D 11/00* (2013.01); *F16C 11/04* (2013.01); *E05Y 2900/606* (2013.01)

(58) Field of Classification Search
CPC .......... E05Y 2201/71; E05Y 2900/606; E05Y 2900/60; G06F 1/1681; G06F 1/168; G06F 1/1616; G06F 1/1618; H04M 1/022; H04M 1/0225; H04M 1/0218; H04M 1/0216; E05D 11/1021; E05D 11/00; E05D 11/1047; E05D 11/1007; E05D 3/06; E05D 3/12; E05D 3/122; E05D 3/16; E05D 15/32; E05D 5/00; E05D 5/02; E05D 5/023; E05D 5/0238; E05D 5/16; Y10T 16/547; Y10T 16/5257; Y10T 16/525; Y10T 16/5474; Y10T 16/5475; Y10T 16/541; Y10T 16/54038; F16C 11/04

See application file for complete search history.

(56) References Cited

U.S. PATENT DOCUMENTS 3,525,483 A * 8/1970 Van Alstyne .......... B64G 1/222
                                                  244/172.6
3,733,758 A * 5/1973 Maier ................... B64G 1/222
                                                  52/113

(Continued)

FOREIGN PATENT DOCUMENTS

| EP | 2149663 A1 | 2/2010 |
|---|---|---|
| EP | 3155497 A1 | 4/2017 |
| WO | 2015191408 A1 | 12/2017 |

OTHER PUBLICATIONS

"International Search Report and Written Opinion Issued in PCT Application No. PCT/US19/037850", dated Sep. 13, 2019, 12 Pages.

(Continued)

*Primary Examiner* — Chuck Y Mah
(74) *Attorney, Agent, or Firm* — Rainier Patents, P.S.

(57) ABSTRACT

The description relates to hinged devices, such as hinged computing devices. One example can include first and second portions and a hinge assembly secured to the first and second portions. The hinge assembly can define first, second, and third hinge axes. The hinge assembly can include a first timing cord that synchronizes rotation around the first and second hinge axes and a second timing cord that synchronizes rotation around the second and third hinge axes.

20 Claims, 11 Drawing Sheets

(56) References Cited

U.S. PATENT DOCUMENTS

| | | | | |
|---|---|---|---|---|
| 5,509,747 | A * | 4/1996 | Kiendl | B64G 1/222 |
| | | | | 136/245 |
| 6,834,834 | B2 * | 12/2004 | Dazet | B64C 1/1407 |
| | | | | 16/368 |
| 7,328,481 | B2 * | 2/2008 | Barnett | E05D 3/08 |
| | | | | 16/227 |
| 7,520,028 | B2 * | 4/2009 | Borleis | E05D 3/122 |
| | | | | 16/354 |
| 8,365,359 | B2 * | 2/2013 | Morishita | E05D 3/127 |
| | | | | 16/354 |
| 8,959,714 | B2 * | 2/2015 | Hsu | G06F 1/1681 |
| | | | | 16/287 |
| 8,959,715 | B2 * | 2/2015 | Hsu | E05D 3/06 |
| | | | | 16/227 |
| 8,959,719 | B2 * | 2/2015 | Hsu | G06F 1/1618 |
| | | | | 16/303 |
| 9,242,744 | B2 * | 1/2016 | Baudasse | B64G 1/222 |
| 9,964,989 | B2 * | 5/2018 | Krivoy | G06F 1/1618 |
| 2010/0024169 | A1 * | 2/2010 | Self | A47K 3/36 |
| | | | | 16/354 |
| 2011/0000136 | A1 * | 1/2011 | Brun | E05D 3/06 |
| | | | | 49/358 |
| 2011/0157780 | A1 * | 6/2011 | Wang | G06F 1/1681 |
| | | | | 361/679.01 |
| 2014/0042293 | A1 | 2/2014 | Mok et al. | |
| 2014/0338482 | A1 * | 11/2014 | Hsu | F16H 19/08 |
| | | | | 74/96 |
| 2015/0378400 | A1 * | 12/2015 | Sprenger | G06F 1/1681 |
| | | | | 361/679.55 |
| 2017/0185104 | A1 | 6/2017 | Krivoy et al. | |
| 2017/0356225 | A1 | 12/2017 | Maatta | |
| 2017/0357294 | A1 | 12/2017 | Siddiqui et al. | |
| 2018/0341288 | A1 * | 11/2018 | Senatori | G06F 1/16 |
| 2020/0033916 | A1 | 1/2020 | Aagaard et al. | |

OTHER PUBLICATIONS

"International Search Report and Written Opinion Issued in PCT Patent Application No. PCT/US2019/056411", dated Jan. 13, 2020, 11 Pages.

* cited by examiner

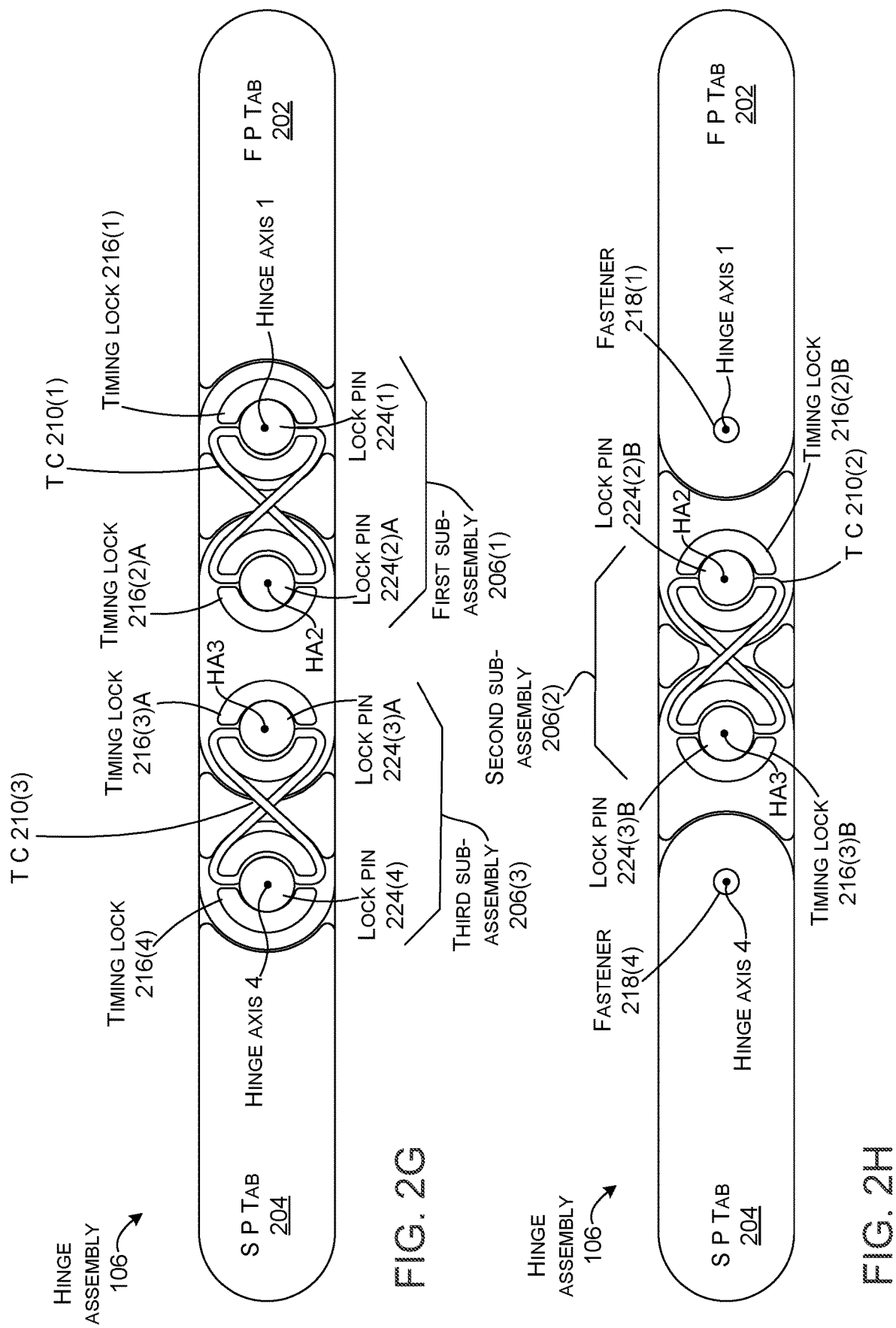

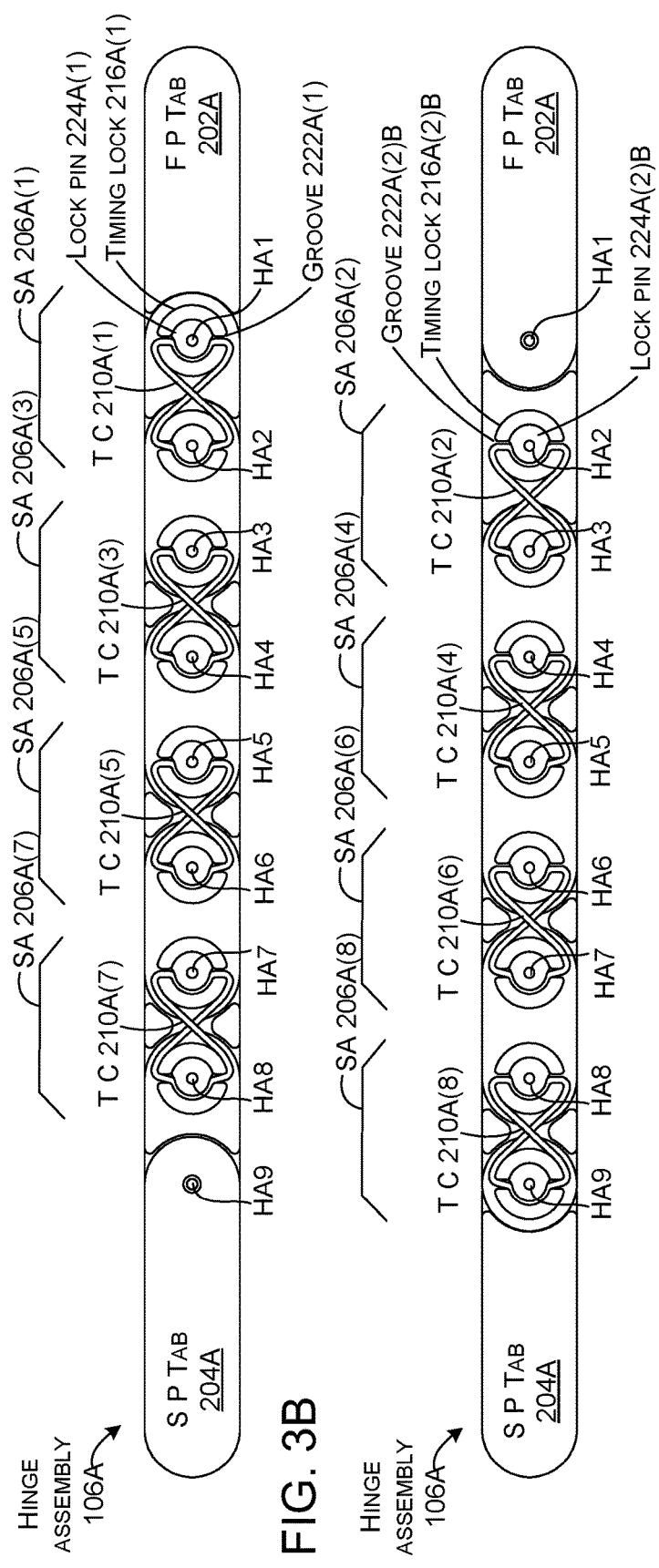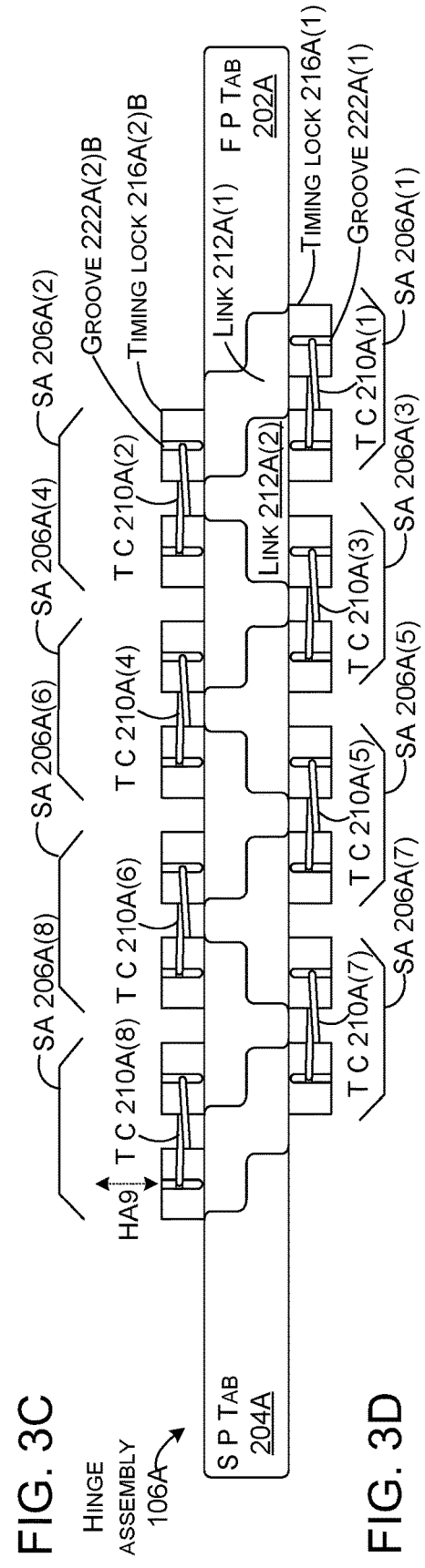

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

FIGS. 2E-2H and 3B-3D show elevational views of example devices in accordance with some implementations of the present concepts.

DESCRIPTION

The present concepts relate to devices, such as computing devices employing hinge assemblies. The hinge assemblies can rotationally secure first and second device portions. The hinge assemblies can rotate around multiple hinge axes. Some of the present hinge assemblies can be synchronized such that rotation around each hinge axis is accompanied by the same amount of symmetrical rotation around the other hinge axes. This aspect can be achieved with a combination of synchronizing elements. The synchronizing elements can be manifest as timing cords that synchronize rotation around a pair of adjacent hinge axes. The total number of hinge axes can be increased by adding additional pairs of synchronized hinge axes, such that adjacent pairs share a common hinge axis.

Figure 1:
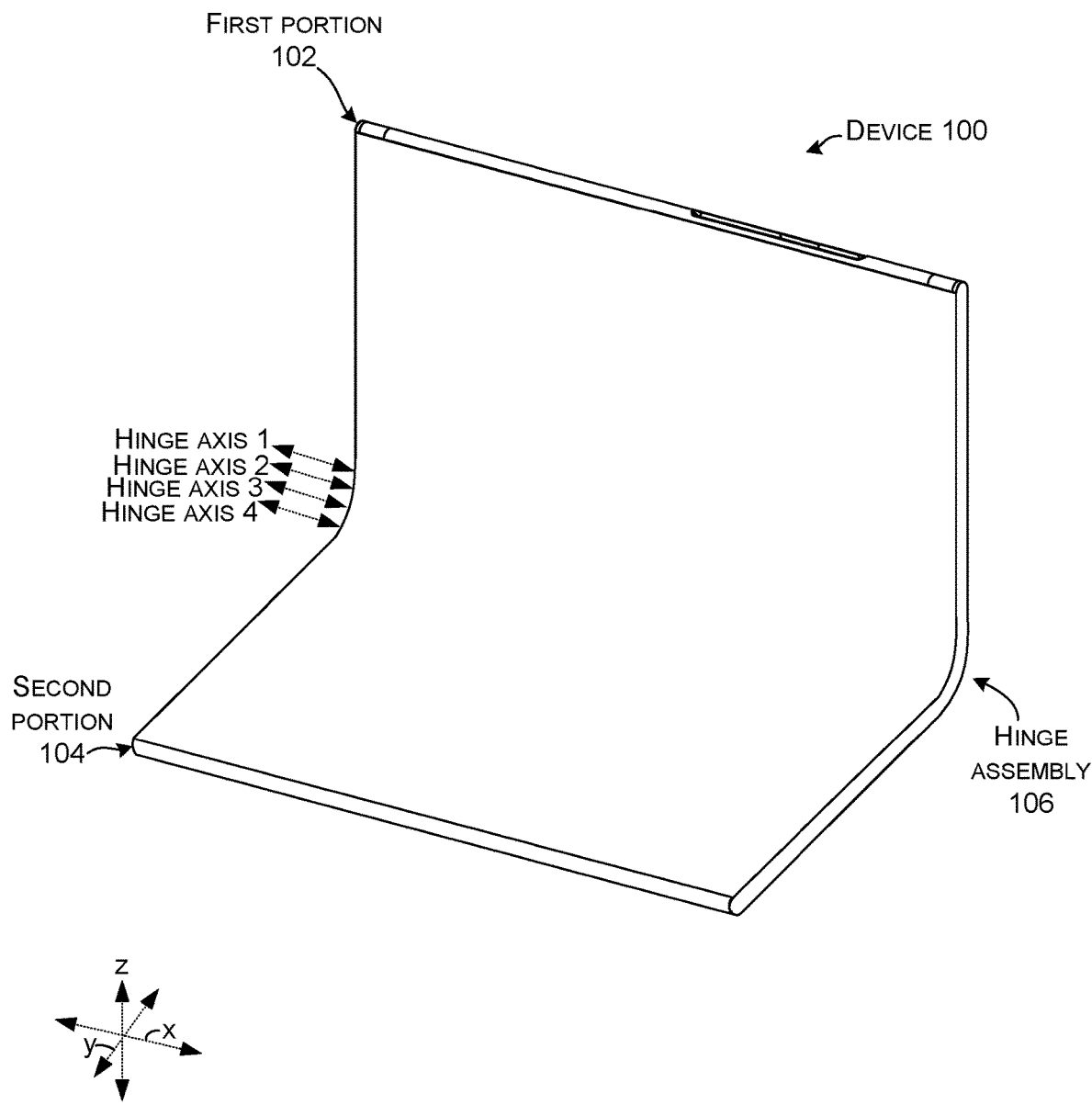
FIGS. 1, 2A, 2B, 3A, and 4B-4E show perspective views of example devices in accordance with some implementations of the present concepts.

Introductory FIG. 1 shows an example device 100 that has first and second portions 102 and 104 that are rotatably secured together by one or more hinge assembly(s) 106. The hinge assembly 106 can rotate around two or more hinge axes (HA). This illustrated implementation includes four hinge axes (HA1-HA4). FIG. 3A-3D show an alternative hinge assembly that includes nine hinge axes.

Figure 2A:
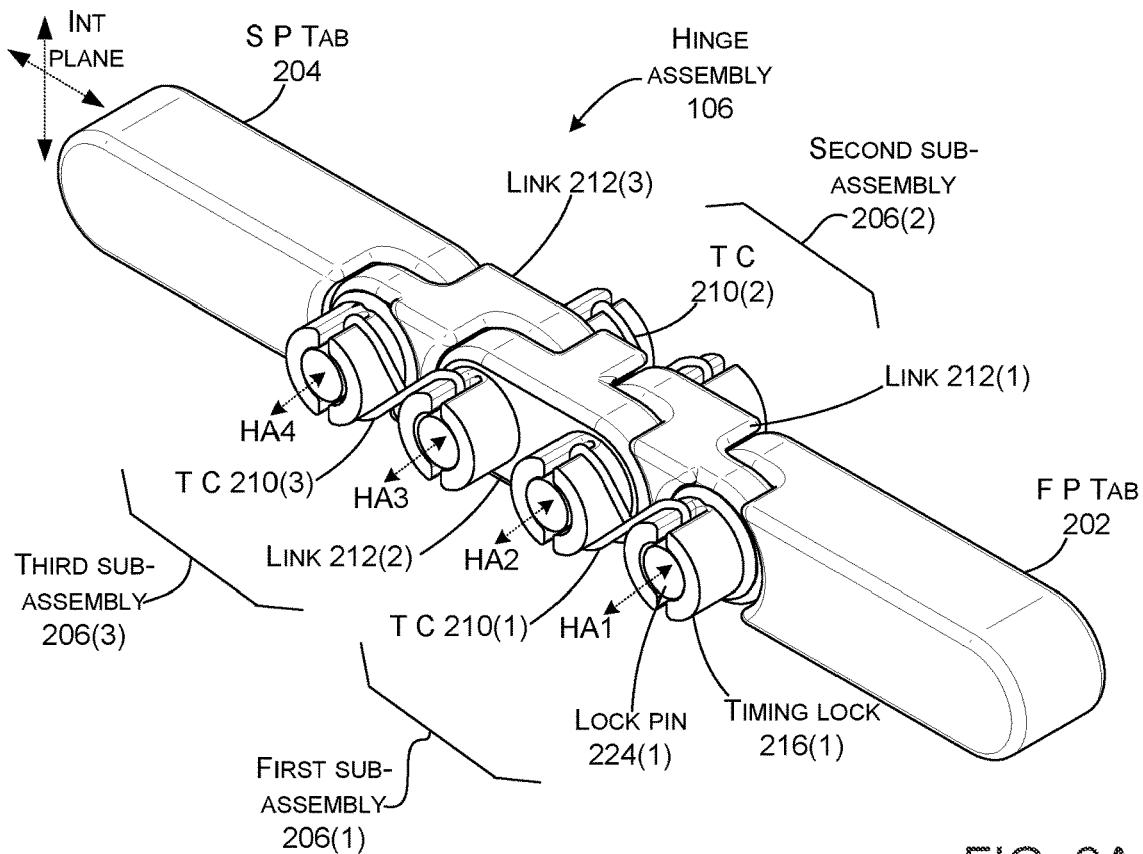
Figure 2B:
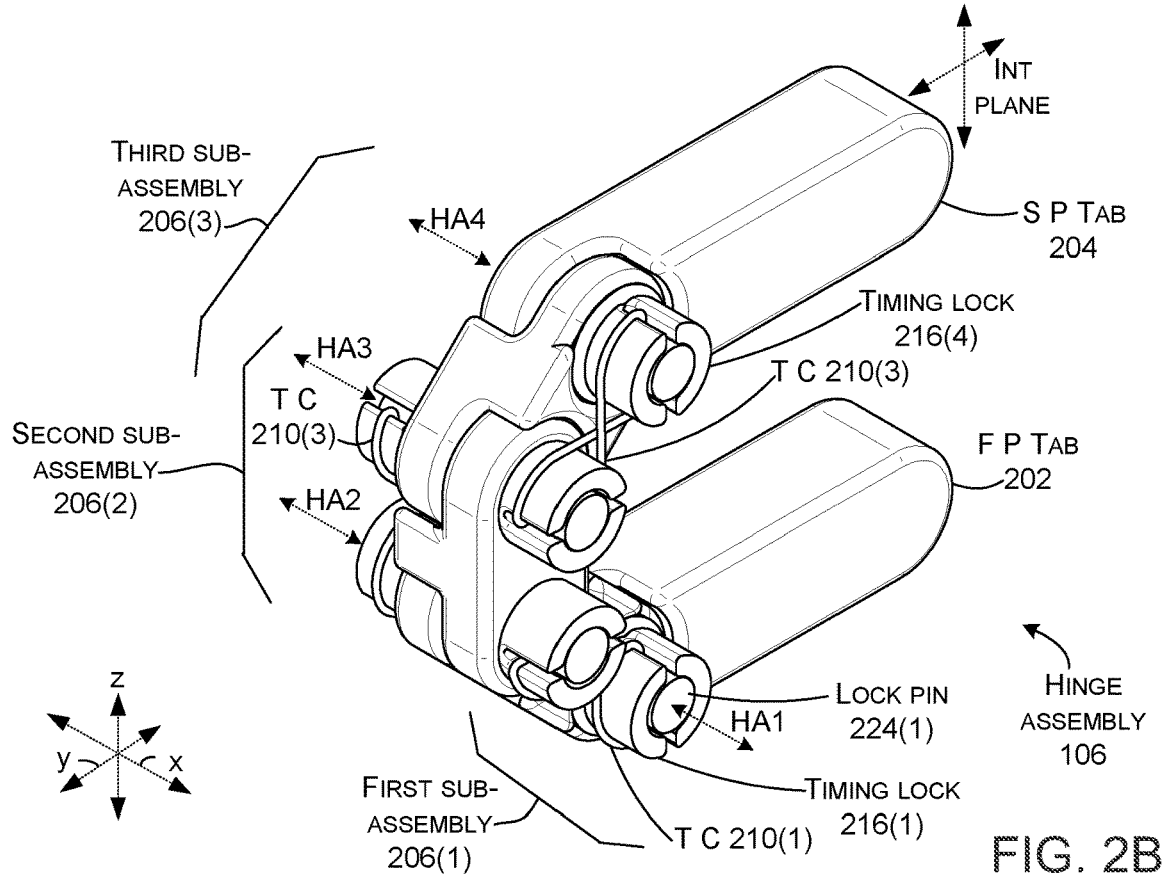
Figure 2C:
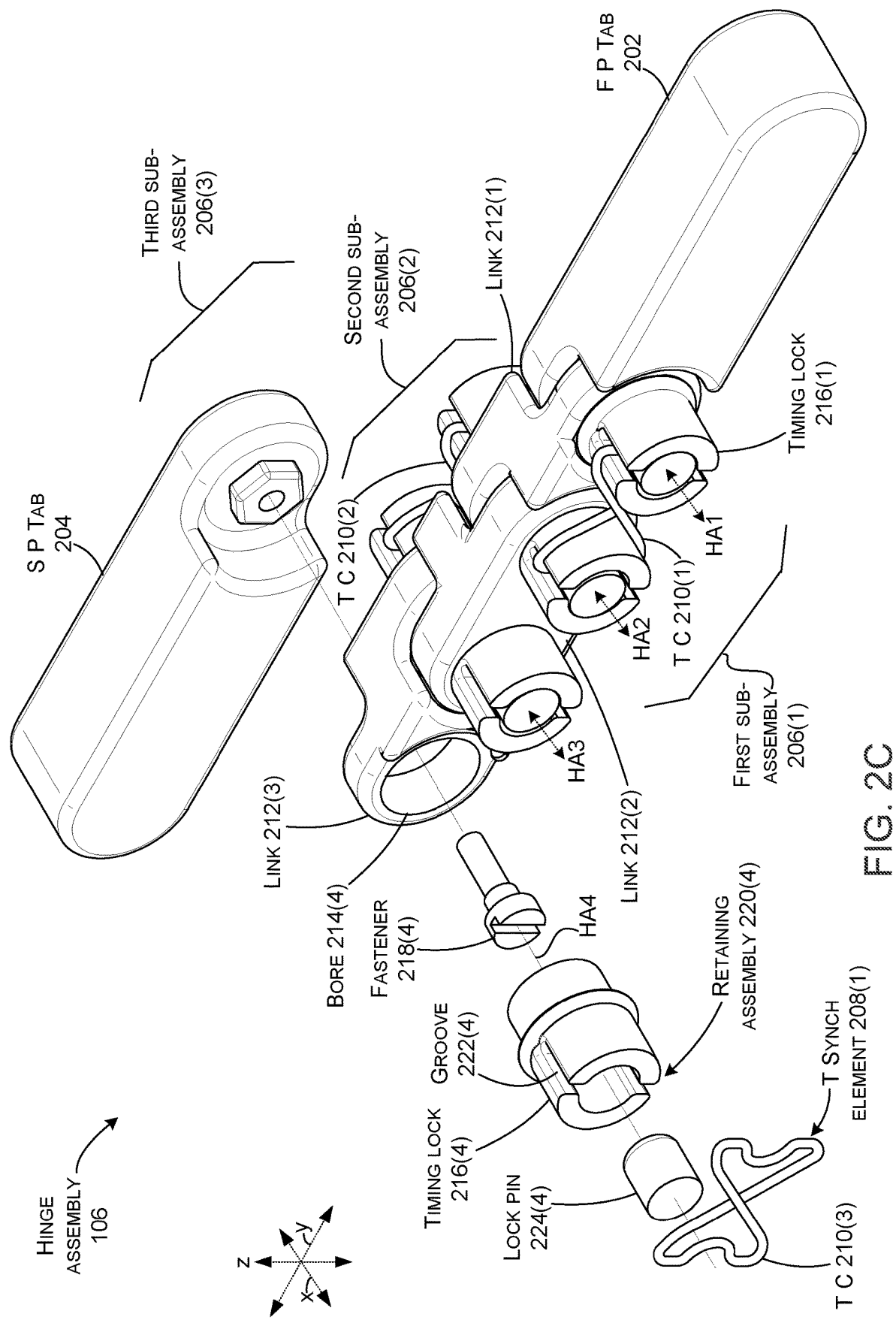
FIGS. 2C, 2D, and 4A show exploded perspective views of example devices in accordance with some implementations of the present concepts.
Figure 2D:
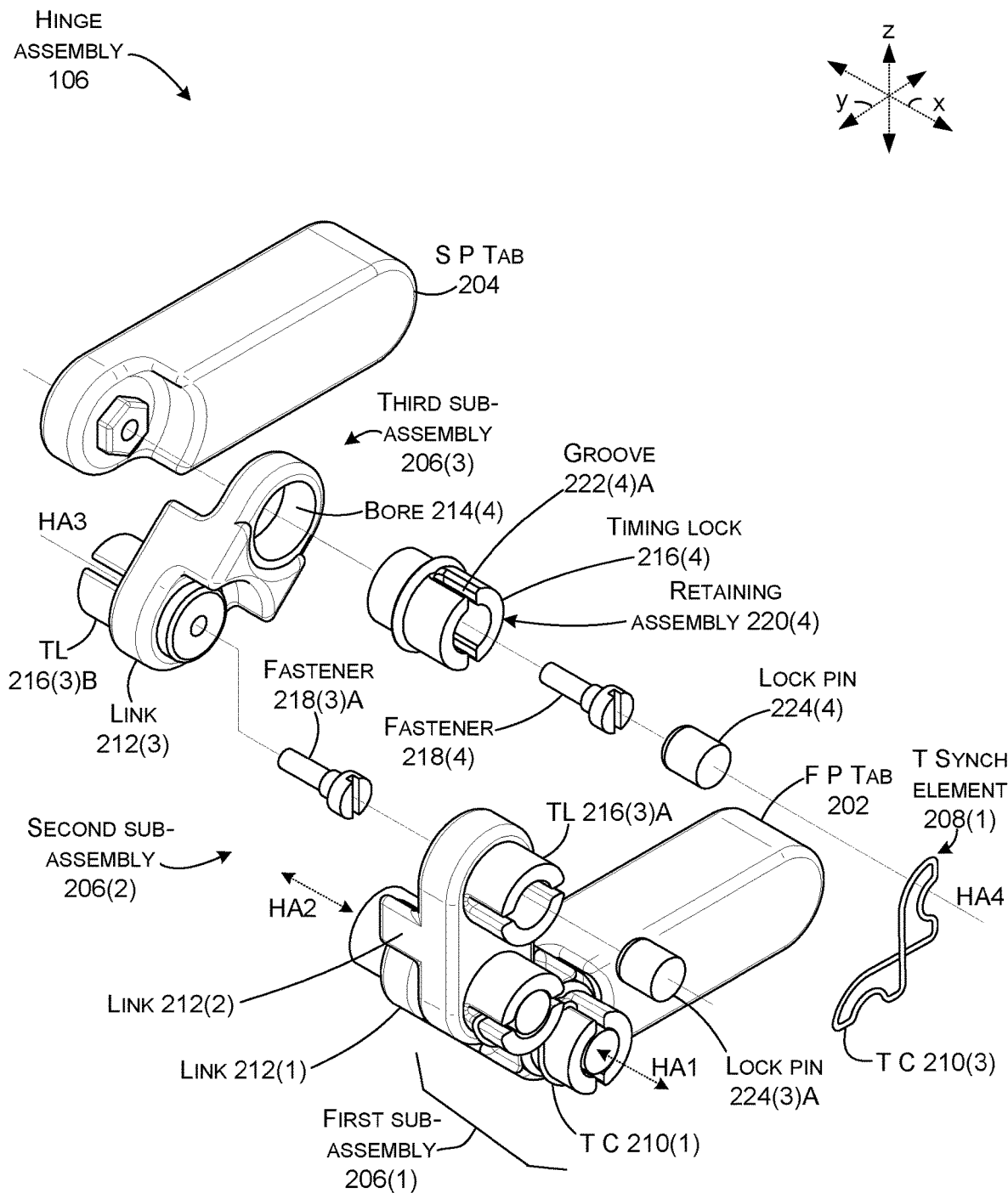
Figure 2E:
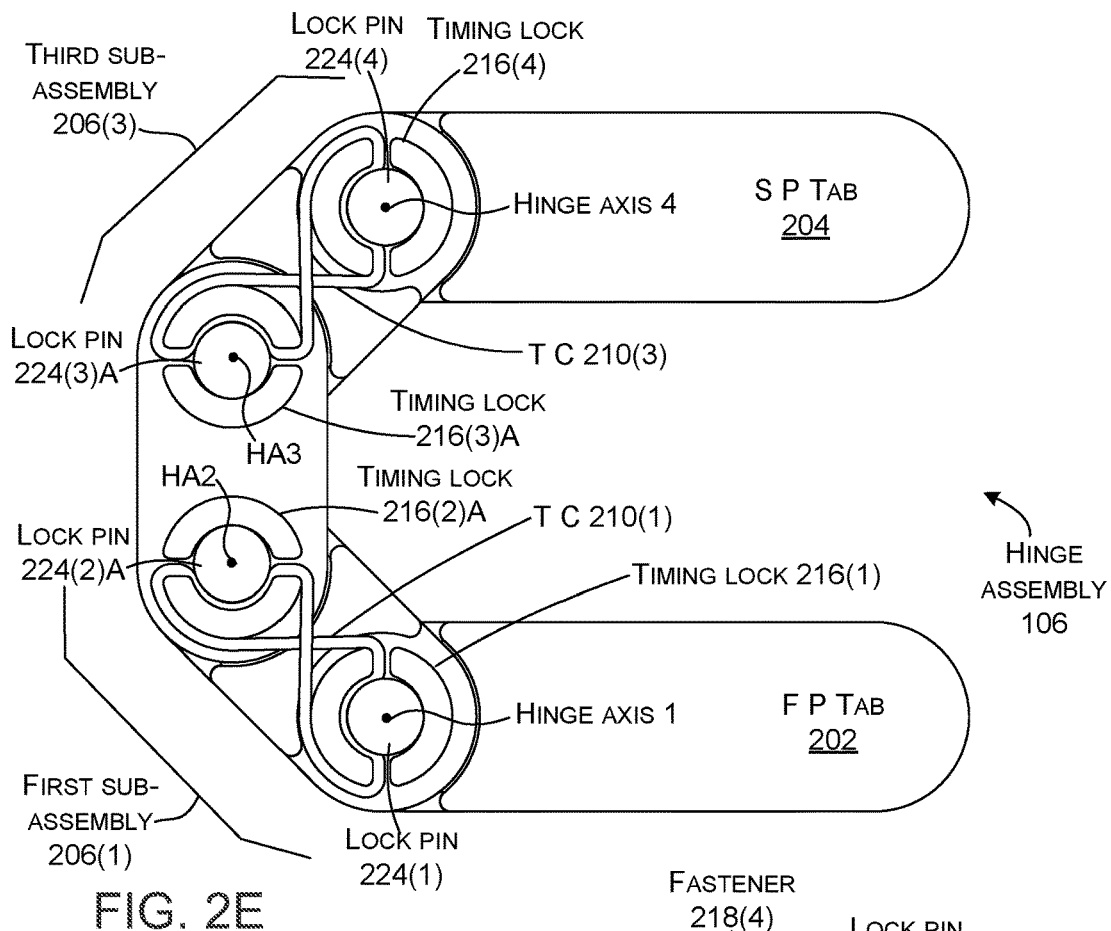
Figure 2F:
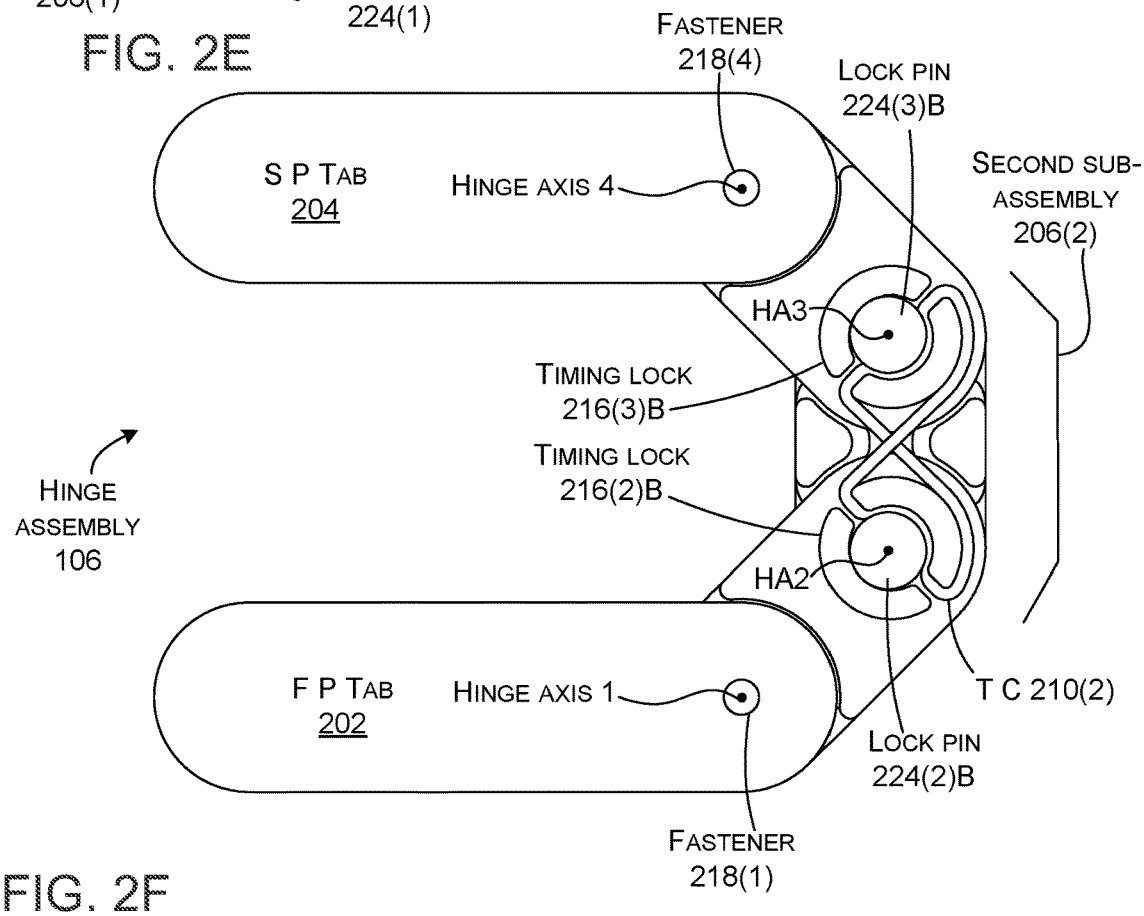
Figure 3A:
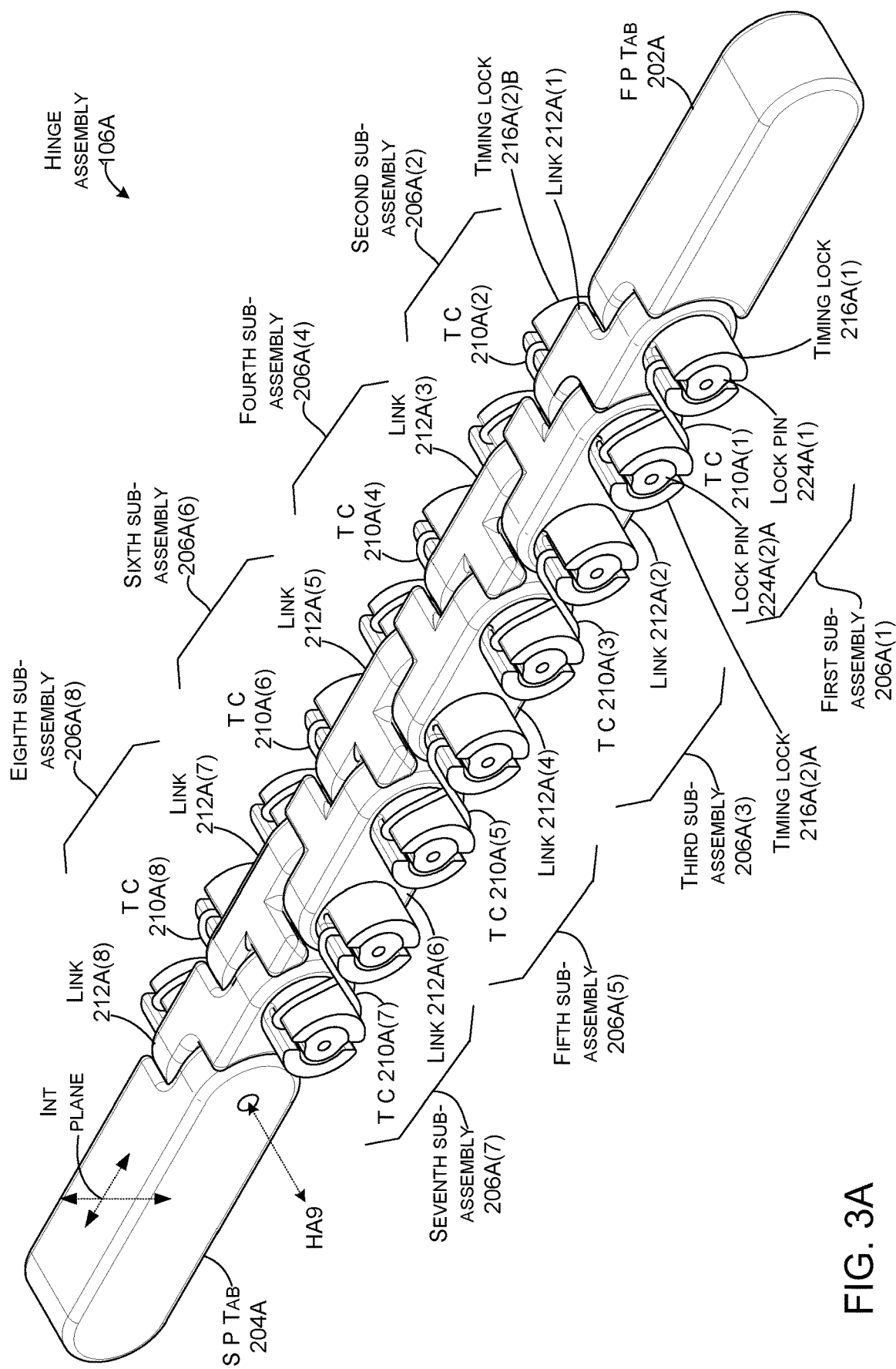

FIGS. 2A-2H collectively show details of example hinge assembly 106. FIG. 2A shows the hinge assembly in a 180-degree orientation. FIG. 2B shows the hinge assembly in a zero-degree orientation. FIG. 2C is a partially exploded view at the 180-degree orientation of FIG. 2A. FIG. 2D is a partially exploded view at the zero-degree orientation of FIG. 2B. FIGS. 2E and 2F show opposing elevational views of the hinge assembly in the zero-degree orientation. FIGS. 2G and 2H show opposing elevational view of the hinge assembly in the 180-degree orientation.

In this case, the hinge assembly 106 includes a first portion tab 202 and a second portion tab 204. The first portion tab 202 is configured to be secured to the first portion (102, FIG. 1) and the second portion tab 204 is configured to be secured to the second portion (104, FIG. 1). The hinge assembly 106 can include multiple sub-assemblies 206 interposed between the first portion tab 202 and the second portion tab 204. In this example, three sub-assemblies 206(1), 206(2), and 206(3) are employed. The first sub-assembly 206(1) relates to hinge axes one and two (HA1 and HA2). The second sub-assembly 206(2) relates to hinge axes two and three (HA2 and HA3). The third sub-assembly 206(3) relates to hinge axes three and four (HA3 and HA4). Notice that there is overlap between the sub-assemblies (e.g., the first sub-assembly and the second sub-assembly both relate to the second hinge axis (HA2) and the second sub-assembly and the third sub-assembly both relate to the third hinge axis (HA3)). Further, adjacent sub-assemblies can occur on opposite sides of a plane (e.g., 'Int Plane', FIGS. 2A and 2B) that passes through the first portion tab 202 and the second portion tab 204 and that intersects the hinge axes orthogonally (e.g., is parallel to the yz-reference plane).

As mentioned above, each sub-assembly 206 can relate to two hinge axes (HA). The sub-assembly can include a tensioned synchronizing element 208 (FIGS. 2C and 2D) that synchronizes rotation around the two hinge axes. In some cases, the tensioned synchronizing element 208 is manifest as a timing cord 210 that synchronizes rotation around adjacent hinge axes. For instance, first sub-assembly 206(1) relates to hinge axis one and hinge axis two (HA1 and HA2). Timing cord 210(1) synchronizes rotation around these two hinge axes (e.g., 20 degrees of rotation around hinge axis one is accompanied by 20 degrees of simultaneous rotation around hinge axis two). (In the section that follows there are multiple instances of many of the elements that are introduced. Note, it is not feasible to label every instance of every element on the drawing pages).

In this implementation, the hinge assembly 106 includes overlapping links 212. The overlapping link 212(1) overlaps with the first portion tab 202 and link 212(2), which in turn overlaps overlapping link 212(3), which in turn overlaps second portion tab 204. Two hinge axes pass through each overlapping link 212. From one perspective, links 212(1) and 212(3) can be viewed as 'end links' in that they connect between a tab and a link, and link 212(2) can be viewed as a 'mid link' or 'intermediary link' that connects between two other links. The links can define a pair of parallel bores 214 (FIG. 2C) that are co-extensive with the hinge axes (HA). The bores 214 are aligned through adjacent links 212. Timing locks 216 can be positioned in the bores 214. The timing locks 216 can be secured with fasteners 218, which also serve to secure the overlapping links 212 (and overlapping links and tabs). This can be visualized in FIG. 2C where timing lock 216(4) extends through bore 214(4) in end link 212(4) and is secured to second portion tab 204 by fastener 218(4). (Note that relative to hinge axes two and three, bores 214, timing locks 216, and fasteners 218 occur on both sides of the yz-plane. The suffix 'A' at the end of the designator is used for those elements on one side of the plane and the suffix 'B' at the end of the designator is used for the other side of the plane). Other mechanisms can be used to secure the hinge assembly 106 to the first and second portions 102 and 104. For instance, the 'end' links could be directly secured to the first and second portions.

A retaining assembly 220 can be employed to retain the timing cord 210 relative to the timing locks 216 of an individual sub-assembly 206. In this implementation, the retaining assembly is manifest as grooves 222 in the timing locks 216. The timing cord 210 can be retained in the grooves 222 by a lock pin 224. Other retaining assembly configurations are contemplated. For instance, in one case, the timing cord could be manifest as a steel cable (e.g., wire rope) that is welded to the timing locks 216 to retain the timing cord 210 relative to the timing locks 216. In another case, the timing cord could include tabs (not shown) that engage the grooves 222 to lock a specific portion of the timing cord 210 to the timing lock 216 to prevent rotation of either of the timing cord 210 or the timing lock 216 relative to the other (e.g., prevent slipping).

In some implementations, the timing cord 210 can be tensioned utilizing a continuous loop of cord that is slightly undersized relative to a path between grooves 222 of adjacent timing locks 216. The cord can be formed into a figure-eight shape or configuration. The cord can be forced (e.g., tensioned or stretched) over the timing locks 216 into the grooves 222 to create the timing cord 210. The timing cord 210 can be locked in place with the lock pins 224, which can be friction fit into the timing locks 216. The timing cord 210 can be under tension and have low elongation properties to maintain the tension. The figure-eight timing cord 210 ensures that the timing cord remains under tension throughout a range of rotation around the respective hinge axes. In still another case, the timing cord 210 could be a length of cord that is wound through the grooves 222 of the two adjacent timing locks 216 in the figure-eight configuration. Tension could be applied to the ends of the length of cord while the lock pins 224 are inserted into the bores 214 to retain the timing cord under tension. Once such example is described below relative to FIGS. 4A-4E.

The timing cord 210 can be made from a single strand and/or can be multi-stranded. The timing cord can have a rounded cross-sectional profile, a flattened cross-sectional profile, or a v-shaped profile, among other profiles.

FIGS. 2E and 2F show opposite sides of the hinge assembly 106 at the zero-degree orientation. Similarly, FIGS. 2G and 2H show opposite sides of the hinge assembly 106 at the 180-degree orientation. As mentioned above, the timing cord 210 of a sub-assembly 206 synchronizes rotation around the two hinge axes associated with the sub-assembly. Overlap of adjacent sub-assemblies 206 can synchronize rotation around additional hinge axes.

In this example, as illustrated in FIGS. 2E and 2G, timing cord 210(1) synchronizes rotation around hinge axis one (HA1) and hinge axis two (HA2) of the first sub-assembly 206(1). As illustrated in FIGS. 2F and 2H, timing cord 210(2) synchronizes rotation around hinge axis two (HA2) and hinge axis three (HA3) of the second sub-assembly 206(2). Similarly, as illustrated in FIGS. 2E and 2G, timing cord 210(3) synchronizes rotation around hinge axis three (HA3) and hinge axis four (HA4) of the third sub-assembly 206(3). Thus, the first and second sub-assemblies overlap relative to hinge axis two: the first sub-assembly 206(1) synchronizes rotation around hinge axis two to rotation around hinge axis one and second sub-assembly 206(2) synchronizes rotation around hinge axis two to rotation around hinge axis three. Similarly, the third sub-assembly 206(3) synchronizes rotation around hinge axis three to rotation around hinge axis four. As such, the combination of the overlapping adjacent sub-assemblies can collectively synchronize all of the hinge axes. Thus, rotation around any individual hinge axis is synchronized to simultaneous and equal rotation around each of the other hinge axes. Note that while the synchronized rotation is illustrated from the zero-degree orientation to the 180-degree orientation, the synchronized rotation can continue to the 360-degree orientation (e.g., the second portion tab 204 underlying and parallel to the first portion tab 202). In such a case, 90 degrees of simultaneous rotation occurs around each of the four hinge axes between the zero-degree orientation and the 360-degree orientation. Other implementations may rotate less than 360.

For instance, stops could be employed relative to each hinge axis to limit the amount of rotation. Still other implementations may have a range of rotation that is greater than 360 degrees. For instance, in an implementation where the first and/or second portions are wedge-shaped (e.g., thicker proximate to the hinge assembly than distal to the hinge assembly), the first and second portions could be rotated through 370 degrees of rotation, for example.

FIGS. 3A-3D show another example hinge assembly 106A. (The suffix 'A' directly following the numerical designator is used to distinguish from the example illustrated in FIGS. 2A-2H). As mentioned above, the present concepts can be applied to any number of hinge axes by adding additional sub-assemblies 206A. This implementation includes nine hinge axes and the hinge assembly 106A can rotate 360 degrees as measured at the first portion tab 202A rotating relative to the second portion tab 204A. In this case, eight sub-assemblies 206A(1)-206A(8) operate relative to the nine hinge axes to ensure that the 360 degrees of rotation is accomplished by 40 degrees of simultaneous rotation around each hinge axis (HA1-HA9). Note that hinge axes and sub-assemblies can be added or subtracted from the illustrated number as desired.

The number of hinge axes and/or the distance between hinge axes can affect a bend profile of the hinge assembly. Rotation relative to each intermediate hinge axis can be synchronized by two timing cords 210: one timing cord synchronizing rotation relative to the adjacent hinge axis in one direction and the other timing cord synchronizing rotation relative to the adjacent hinge axis in the other direction. For instance, rotation around hinge axis two (HA2) is synchronized to hinge axis one (HA1) by timing cord 210A(1) and to hinge axis three (HA3) by timing cord 210A(2).

The sub-assemblies 206A relate to overlapping links 212A. (The first sub-assembly 206A(1) relates to link 212A(1) that overlaps first portion tab 202A and the last (e.g., eighth) sub-assembly relates to link 212A(8) overlapping the second portion tab 204A). In this case, 'intermediate' links 212A(2)-212A(7) can be identical to one another, with every other link flipped 180 degrees relative to the intersecting (Int) plane. The timing locks 216A can secure the timing cords relative to the hinge axes and the links.

Any number of hinge axes and timing cords 210A can be employed as desired. For instance, the total number of hinge axes can be termed a set. A first timing cord 210A(1) can synchronize rotation around a first sub-set of the set of hinge axes (e.g., HA1 and HA2). A second timing cord 210A(2) can synchronize rotation around a second sub-set of the set of hinge axes (e.g., HA2 and HA3), etc. until all members of the set are synchronized to rotate together and equally.

Figure 4A:
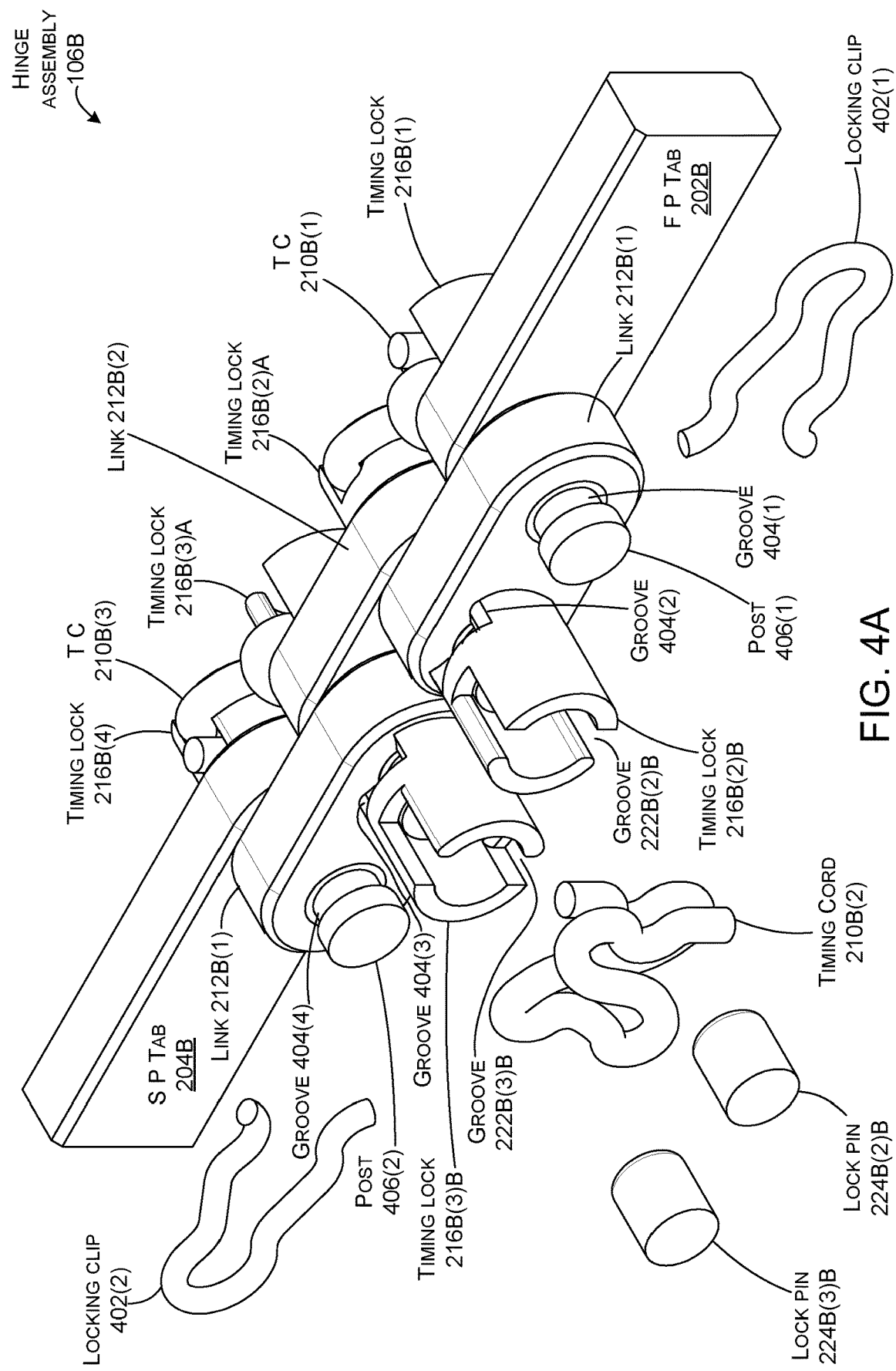
Figure 4B:
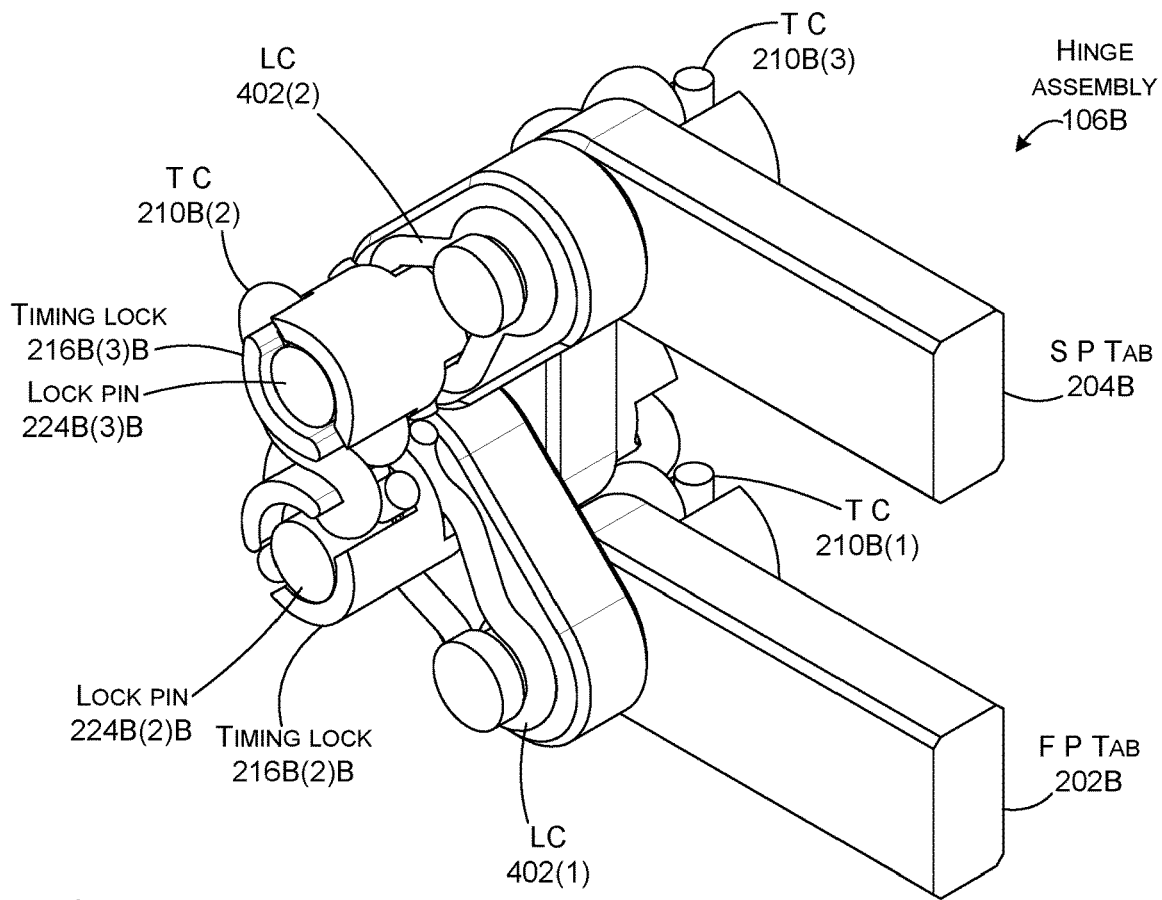
Figure 4C:
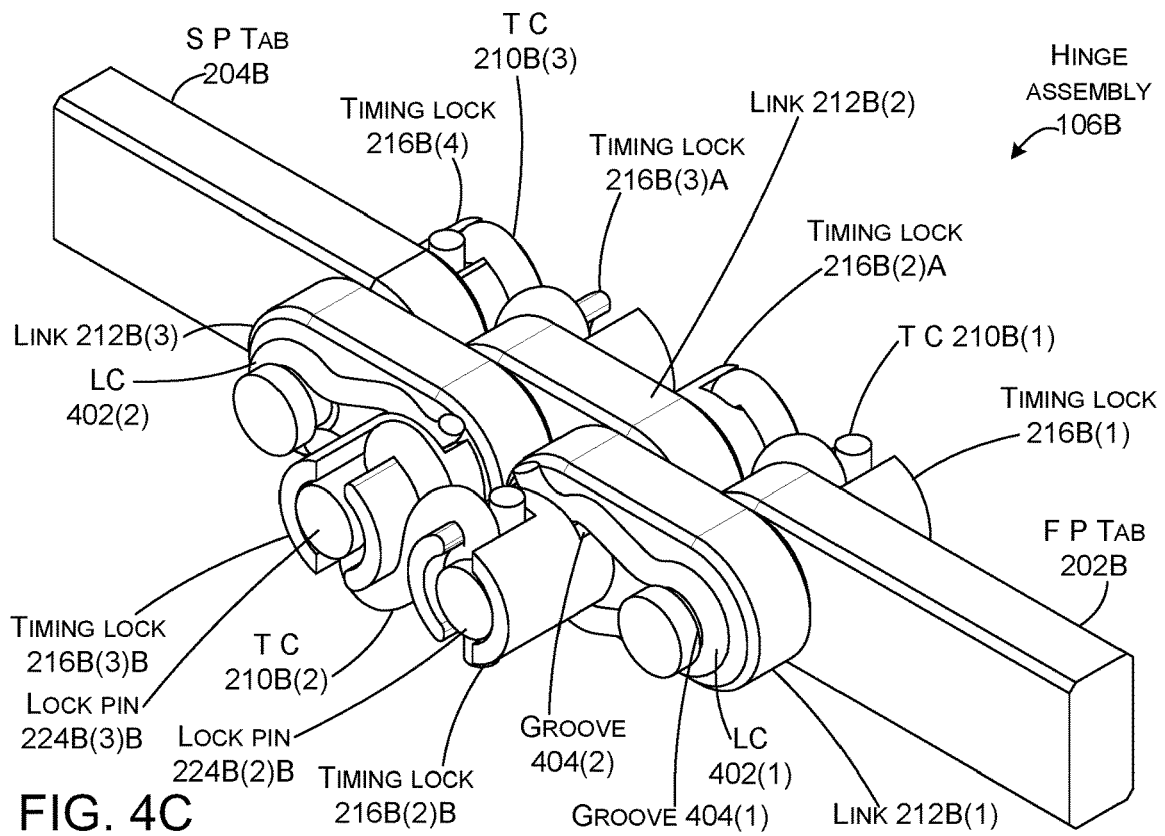
Figure 4D:
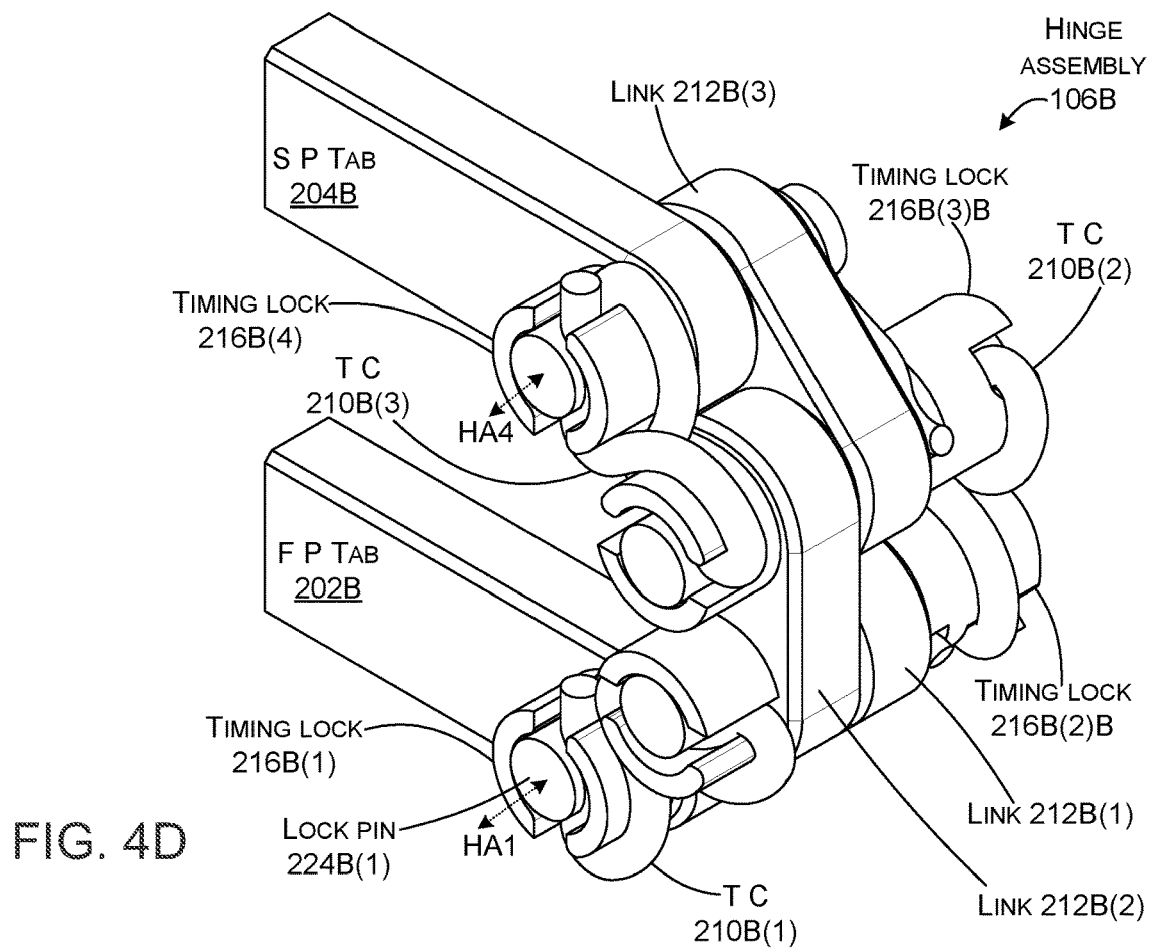
Figure 4E:
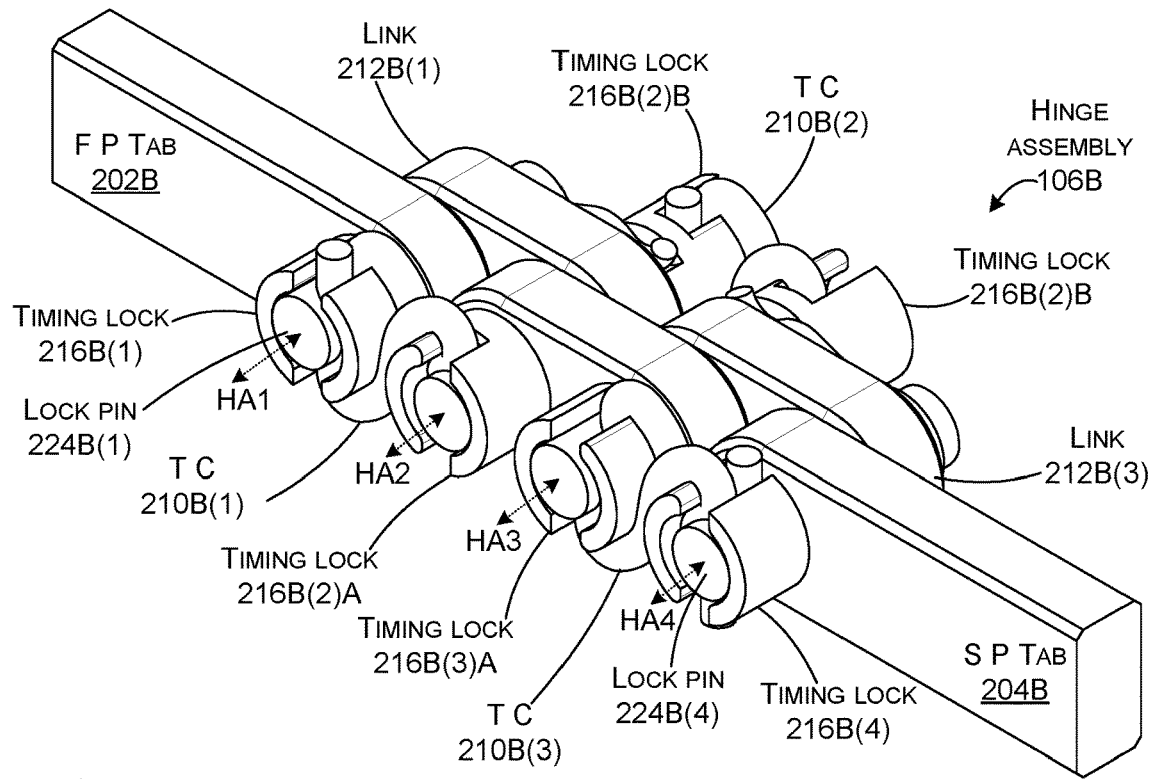

FIGS. 4A-4E show another example hinge assembly 106B. FIG. 4A shows an exploded view in the 180-degree orientation. FIGS. 4B and 4C show the hinge assembly 106B in the closed and 180-degree orientations from a first side. FIGS. 4D and 4E show the hinge assembly 106B in the closed and 180-degree orientations from an opposite side. (The suffix 'B' directly following the numerical designator is used to distinguish this example from the example implementations described above).

In this implementation, locking clips 402 ride in grooves 404 that relate to two adjacent hinge axes. For instance, groove 404(1) is defined by a post 406(1) extending from link 212B(1). The post 406(1) is co-extensive with the first hinge axis HA1. Similarly, post 406(2) is co-extensive with hinge axis four (HA4) and defines groove 404(4). Groove 404(2) is defined by timing lock 216B(2) B and groove 404(3) is defined by timing lock 216B(3) B. Locking clip 402(1) is retained in grooves 404(1) and 404(2) and locking clip 402(2) is retained in grooves 404(3) and 404(4). The locking clips 402 in combination with the grooves 404 can secure the hinge assembly 106B together (e.g., prevent migration of elements parallel to the hinge axes). Stated another way, the locking clips can provide an axial constraint on the hinge assembly to keep it together while still allowing for a radial degree of freedom.

The locking clips 402 and links 212B can enable a very small distance between adjacent hinge axes. From one perspective, the locking clips can substantially constrain the hinge assembly 106B in the axial direction with sufficient clearance so as not to bind the hinge assembly when parts are produced at their worst-case tolerances. Allowing adjacent hinge axes to be close together allows the bend radius in the closed orientation (e.g., half the distance between the first and last hinge axis (HA1 and HA4 in this case)) to be very small. In some cases, a theoretical minimum pitch between adjacent axes is limited by the diameter of each pivot. The locking clips can allow this size reduction as radial wall thicknesses are not a design constraint as they may be on some other implementations.

As mentioned above, some implementations can use a non-continuous cord to form the timing cord 210B. Hinge assembly 106B illustrates such a configuration. Looking at FIG. 4A, a length of cord can be positioned in groove 222B(2) B of timing lock 216B(2) B with the first tag end retained. The cord can be wound through groove 222B(3) B of timing lock 216B(3) B in a figure-eight manner and back through groove 222B(2) B. Tension can be applied to both tag ends while the lock pins 224B(2) B and 224B(3) B are inserted into the timing locks to retain the cord under tension as timing cord 210B(2).

Various synchronizing element implementations are described above. As mentioned the synchronizing element can be manifest as a timing cord(s), such as a wire, belt, cable, or rope. The synchronizing element can be made from various materials, such as various metals and/or synthetic materials. The synchronizing element can be selected from a material and constructed in a manner to have low elongation to effectively deal with torque differentials between timing locks 216A so that both sides of the synchronizing element remain at relatively equal lengths and tensions.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-4E.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a hinge assembly coupling a first portion and a second portion. The hinge assembly comprises a first sub-assembly and an overlapping second sub-assembly, the first sub-assembly comprising a first timing cord that synchronizes rotation around first and second hinge axes. The second sub-assembly comprises a second timing cord that synchronizes rotation around the second hinge axis and a third hinge axis.

Another example can include any of the above and/or below examples where the first sub-assembly comprises a first timing lock that is co-extensive with the first hinge axis and a second timing lock that is co-extensive with the second hinge axis.

Another example can include any of the above and/or below examples where the second sub-assembly comprises a third timing lock that is co-extensive with the second hinge axis and a fourth timing lock that is co-extensive with the third hinge axis.

Another example can include any of the above and/or below examples where the first sub-assembly and the second sub-assembly lie in a plane that is orthogonal to the first, second, and third hinge axes.

Another example can include any of the above and/or below examples where the first and second timing locks lie on a first side of a plane that is orthogonal to the first, second, and third hinge axes and the third and fourth timing locks lie on a second side of the plane.

Another example can include any of the above and/or below examples comprising a third timed sub-assembly that lies on the first side of the plane Another example can include any of the above and/or below examples where the first and second timing locks define grooves through which the first timing cord passes.

Another example can include any of the above and/or below examples where the first timing cord is arranged between the first and second timing locks in a figure-eight configuration.

Another example can include any of the above and/or below examples comprising a first lock pin that retains the first timing cord in the grooves of the first timing lock and a second lock pin that retains the first timing cord in the grooves of the second timing lock.

Another example can include any of the above and/or below examples where the first timing cord lies on a first side of a plane that orthogonally intersects the first, second, and third hinge axes and the second timing cord lies on a second side of the plane.

Another example can include any of the above and/or below examples where the first timing cord and the second timing cord comprise loops of cord.

Another example can include any of the above and/or below examples where the first hinge axis relates to the first portion and a first link and the second hinge axis relates to the first link and a second link.

Another example includes a device comprising first and second portions and a hinge assembly secured to the first and second portions and defining first, second, and third hinge axes. The hinge assembly comprising a first timing cord that synchronizes rotation around the first and second hinge axes and a second timing cord that synchronizes rotation around the second and third hinge axes.

Another example can include any of the above and/or below examples where the first timing cord and the second timing cord comprise the same timing cord.

Another example can include any of the above and/or below examples where the first timing cord and the second timing cord comprise different timing cords.

Another example can include any of the above and/or below examples where the hinge assembly defines additional hinge axes and comprises additional timing cords and wherein two timing cords operate relative to each hinge axis.

Another example can include any of the above and/or below examples where adjacent timing cords are discontinuous.

Another example can include any of the above and/or below examples where adjacent timing cords are positioned on opposite sides of the hinge assembly.

Another example includes a device comprising first and second portions that rotate around a set of hinge axes and a first timing cord that synchronizes rotation around a first sub-set of the set of hinge axes and a second timing cord that synchronizes rotation around a second sub-set of the set of hinge axes, where the first sub-set and the second sub-set share a common hinge axis.

Another example can include any of the above and/or below examples where adjacent timing cords are positioned on opposite sides of the hinge assembly.

The invention claimed is:

1. A device, comprising:
   a hinge assembly coupling a first portion and a second portion, the hinge assembly comprising a first sub-assembly pivotally connected to an overlapping second sub-assembly; and,
   the first sub-assembly comprising a first timing cord arranged in a figure-eight around first and second hinge axes to synchronize rotation around the first and second hinge axes, and,
   the second sub-assembly comprising a second timing cord arranged in a figure-eight around the second hinge axis and a third hinge axis to synchronize rotation around the second hinge axis and the third hinge axis, such that the rotation around each hinge axis is equivalent in extent and direction and the first sub-assembly and the second sub-assembly at least in part collectively define a bend radius of the hinge assembly.

2. The device of claim 1, wherein the first sub-assembly comprises a first timing lock that is co-extensive with the first hinge axis and a second timing lock that is co-extensive with the second hinge axis.

3. The device of claim 2, wherein the second sub-assembly comprises a third timing lock that is co-extensive with the second hinge axis and a fourth timing lock that is co-extensive with the third hinge axis.

4. The device of claim 3, wherein the first sub-assembly and the second sub-assembly are rotatable in a plane that is orthogonal to the first, second, and third hinge axes.

5. The device of claim 4, wherein the first and second timing locks lie on a first side of the plane and the third and fourth timing locks lie on a second side of the plane.

6. The device of claim 5, further comprising a third sub-assembly pivotally connected to the second sub-assembly and positioned on the first side of the plane.

7. The device of claim 3, wherein the first and second timing locks define grooves through which the first timing cord passes.

8. The device of claim 7, wherein the first timing cord is a continuous loop of cord.

9. The device of claim 7, further comprising a first lock pin that retains the first timing cord in the grooves of the first timing lock and a second lock pin that retains the first timing cord in the grooves of the second timing lock.

10. The device of claim 1, wherein the first timing cord lies on a first side of a plane that orthogonally intersects the first, second, and third hinge axes and the second timing cord lies on a second side of the plane.

11. The device of claim 1, wherein the first timing cord and the second timing cord comprise lengths of cord.

12. The device of claim 1, wherein the first hinge axis pivotally links the first portion and a first link and the second hinge axis pivotally links the first link and a second link.

13. A device, comprising:
    first and second portions; and,
    a hinge assembly secured to the first and second portions and pivotally linking the first and second portions at first, second, and third hinge axes, the hinge assembly comprising a first figure-eight timing cord positioned around the first and second axes and that synchronizes rotation around the first and second hinge axes and a second figure-eight timing cord positioned around the second and third hinge axes and that synchronizes rotation around the second and third hinge axes so that simultaneous and equal rotation occurs around each of the first, second, and third hinge axes to at least in part define a bend profile of the hinge.

14. The device of claim 13, wherein the first timing cord and the second timing cord comprise continuous loops of cord.

15. The device of claim 13, wherein the first timing cord and the second timing cord comprise different timing cords.

16. The device of claim 13, wherein the hinge assembly defines additional hinge axes that are adjacent to the third hinge axis and comprises additional timing cords that operate between adjacent hinge axes and wherein two timing cords operate relative to each hinge axis.

17. The device of claim 16, wherein adjacent timing cords are discontinuous.

18. The device of claim 16, wherein adjacent timing cords are positioned on opposite sides of the hinge assembly.

19. A device, comprising:
    first and second portions pivotally linked by a hinge assembly that defines a set of hinge axes; and,
    a first figure-eight timing cord that synchronizes rotation around a first sub-set of the set of hinge axes and a second figure-eight timing cord that synchronizes rotation around a second sub-set of the set of hinge axes, where the first sub-set and the second sub-set share a common hinge axis of the set of hinge axes and collectively at least in part define a bend radius of the hinge assembly as the first and second portions are rotated relative to one another through a range of orientations.

20. The device of claim 19, wherein adjacent timing cords are positioned on opposite sides of a link through which two adjacent axes of the set of hinge axes passes.

* * * * *